(12) United States Patent
Jiang et al.

(10) Patent No.: US 8,012,624 B2
(45) Date of Patent: Sep. 6, 2011

(54) SINTERED CATHODE COMPOSITIONS

(75) Inventors: Junwei Jiang, Woodbury, MN (US); Chris J. Goodbrake, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 301 days.

(21) Appl. No.: 12/233,997

(22) Filed: Sep. 19, 2008

(65) Prior Publication Data
US 2009/0087747 A1   Apr. 2, 2009

Related U.S. Application Data

(60) Provisional application No. 60/975,940, filed on Sep. 28, 2007.

(51) Int. Cl.
*H01M 4/52* (2010.01)

(52) U.S. Cl. .................................. 429/223; 429/224

(58) Field of Classification Search .............. 429/223, 429/224, 218.1, 231.95, 231.8
See application file for complete search history.

(56) References Cited

U.S. PATENT DOCUMENTS

| | | | |
|---|---|---|---|
| 5,783,333 A | 7/1998 | Mayer | |
| 6,333,128 B1 | 12/2001 | Sunagawa et al. | |
| 6,953,566 B2 | 10/2005 | Ramasamy et al. | |
| 7,008,608 B2 | 3/2006 | Park et al. | |
| 7,141,187 B2 | 11/2006 | Kosuzu et al. | |
| 7,556,655 B2 * | 7/2009 | Dahn et al. | 29/623.1 |
| 7,674,556 B2 * | 3/2010 | Nakura et al. | 429/231.95 |
| 2002/0076613 A1 | 6/2002 | Lee et al. | |
| 2002/0168574 A1 | 11/2002 | Ahn et al. | |
| 2003/0108793 A1 | 6/2003 | Dahn et al. | |
| 2006/0105239 A1 | 5/2006 | Paulsen et al. | |
| 2006/0233696 A1 | 10/2006 | Paulsen et al. | |
| 2007/0026316 A1 | 2/2007 | Imachi et al. | |
| 2007/0057228 A1 | 3/2007 | Huang et al. | |
| 2007/0122705 A1 | 5/2007 | Paulsen et al. | |

FOREIGN PATENT DOCUMENTS

| | | |
|---|---|---|
| JP | 2004-185810 | 7/2004 |
| KR | 10-1999-004384 | 1/1999 |

OTHER PUBLICATIONS

Z.F. Ma, et al., "Electrochemical evaluation of composite cathodes base on blends of $LiMn_2O_4$," Electrochemistry Communications, 3 (2001) pp. 425-428.

Handbook of Analytical Methods for Materials, Materials Evaluation and Engineering, Inc., *Energy Dispersive X-ray Spectroscopy*, 2006, pp. 15-16.

Stuart I. Wright, et al., "Integrated Electron Backscatter Diffraction and X-Ray Energy Dispersive Spectroscopy in the Scanning Electron Microscope," Microscopy and Microanalysis, 11(Suppl 2), 2005, pp. 672-673.

Jisuk Kim, et al., "Improvement of 12V overcharge behavior of $LiCoO_2$ cathode material by $LiNi_{0.8}Co_{0.1}Mn_{0.1}O_2$ addition in a Li-ion cell," Journal of Power Sources, 153 (2006), pp. 349-349.

Arnold M. Stux, et al., "Improved high power Li-ion batteries with $Li_2RuO_3$ addition: A fast charging and fast cycling study," Journal of Power Sources, 165 (2007), pp. 635-639.

M.M. Nowell, et al., "Phase differentiation via combined EBSD and XEDS," Journal of Microscopy, vol. 213, Pt. 3 Mar. 2004, pp. 296-305.

International Search Report, dated Mar. 27, 2009.

* cited by examiner

*Primary Examiner* — Jennifer Michener
*Assistant Examiner* — Monique Wills
(74) *Attorney, Agent, or Firm* — Stephen F. Wolf

(57) ABSTRACT

Provided are compositions useful as cathodes in lithium-ion electrochemical cells. The compositions include particles that include transition metal oxides that have at least two distinct phases with different compositions. Each of the distinct phases comprises a layered O3 crystal structure.

16 Claims, 6 Drawing Sheets

—— Sintering mixture
---- Mechanical blend

SINTERED CATHODE COMPOSITIONS

RELATED APPLICATION

This application claims priority to U.S. Provisional Application Ser. No. 60/975,940, filed Sep. 28, 2007.

FIELD

Provided are compositions useful as cathodes in lithium-ion electrochemical cells.

BACKGROUND

Lithium-ion batteries typically include an anode, an electrolyte, and a cathode that contains lithium in the form of a lithium-transition metal oxide. Examples of transition metal oxides that have been used as cathode materials include lithium cobalt dioxide, lithium nickel dioxide, and lithium manganese dioxide. None of these materials, however, exhibits an optimal combination of high initial capacity, high thermal stability, and good capacity retention after repeated charge-discharge cycling. Recently mixtures of transition metal oxides such as manganese, nickel, and cobalt oxides have been used as cathode materials for lithium-ion electrochemical cells.

SUMMARY

There is a need for cathode compositions and methods of producing cathode compositions that have higher capacity and improved cycling performance.

In one aspect, provided is a cathode composition having particles that include a first distinct phase having a transition metal oxide comprising $Co_aNi_bMn_c$, where a is between 0.60 and 0.96, b is between 0.02 and 0.20, and c is between 0.02 and 0.20, wherein a, b, and c, are molar amounts of cobalt, nickel, and manganese, respectively, and wherein a+b+c=1; and a second distinct phase having a transition metal oxide comprising $Co_xNi_yMn_z$, where x is between 0.40 and 0.60, y is between 0.20 and 0.30, and z is between 0.20 and 0.30, wherein x, y, and z are molar amounts of cobalt, nickel, and manganese, respectively, and wherein a second distinct phase having a transition metal oxide comprising $Co_xNi_yMn_z$, where x is between 0.40 and 0.60, y is between 0.20 and 0.30, and z is between 0.20 and 0.30, wherein x, y, and z are molar amounts of cobalt, nickel, and manganese, respectively, and wherein x+y+z=1, and wherein each of the first distinct phase and the second distinct phase comprises a layered O3 crystal structure.

In another aspect, provided is a cathode composition having particles that include a first distinct phase comprising a transition metal oxide comprising $Co_aNi_bMn_c$, wherein a is between 0.00 and 0.30, b is between 0.60 and 0.90, and c is between 0.00 and 0.20, and where a+b+c=1; and a second distinct phase comprising a transition metal oxide comprising $Co_xNi_yMn_z$, wherein x is between 0.00 and 0.30, y is between 0.40 and 0.60, and z is between 0.20 and 0.40, and where x+y+z=1, wherein each of the first distinct phase and the second distinct phase comprises a layered O3 crystal structure.

In this application:

the articles "a", "an", and "the" are used interchangeably with "at least one" to mean one or more of the elements being described;

the term "metal" refers to both metals and to metalloids such as carbon, silicon and germanium, whether in an elemental or ionic state;

the term "alloy" refers to a composition of two or more metals that have physical properties different than those of any of the constituent metals by themselves;

the term "electrochemically active material" refers to a material that can undergo lithiation and delithiation;

the term "electrochemically inactive material" refers to a material that is incapable of undergoing lithiation and delithiation;

the terms "lithiate" and "lithiation" refer to a process for adding lithium to an electrode material;

the terms "delithiate" and "delithiation" refer to a process for removing lithium from an electrode material;

the terms "powders" or "powdered materials" refer to particles that can have an average maximum length in one dimension that is no greater than about 100 μm;

the terms "charge" and "charging" refer to a process for providing electrochemical energy to a cell;

the terms "discharge" and "discharging" refer to a process for removing electrochemical energy from a cell, e.g., when using the cell to perform desired work;

the phrase "positive electrode" refers to an electrode (often called a cathode) where electrochemical reduction and lithiation occurs during a discharging process; and the phrase "negative electrode" refers to an electrode (often called an anode) where electrochemical oxidation and delithiation occurs during a discharging process.

The above-described cathode compositions, and lithium-ion batteries incorporating these compositions, exhibit one or more advantages such as high initial capacities, high average voltages, and good capacity retention after repeated charge-discharge cycling. In addition, the cathode compositions do not evolve substantial amounts of heat during elevated temperature use, thereby improving battery safety. In some embodiments, the disclosed compositions exhibit several, or even all, of these advantages.

The details of one or more embodiments are set forth in the accompanying drawings and description below. Other features, objects, and advantages will be apparent from the description and drawings, and from the claims.

DETAILED DESCRIPTION

Figure 1:
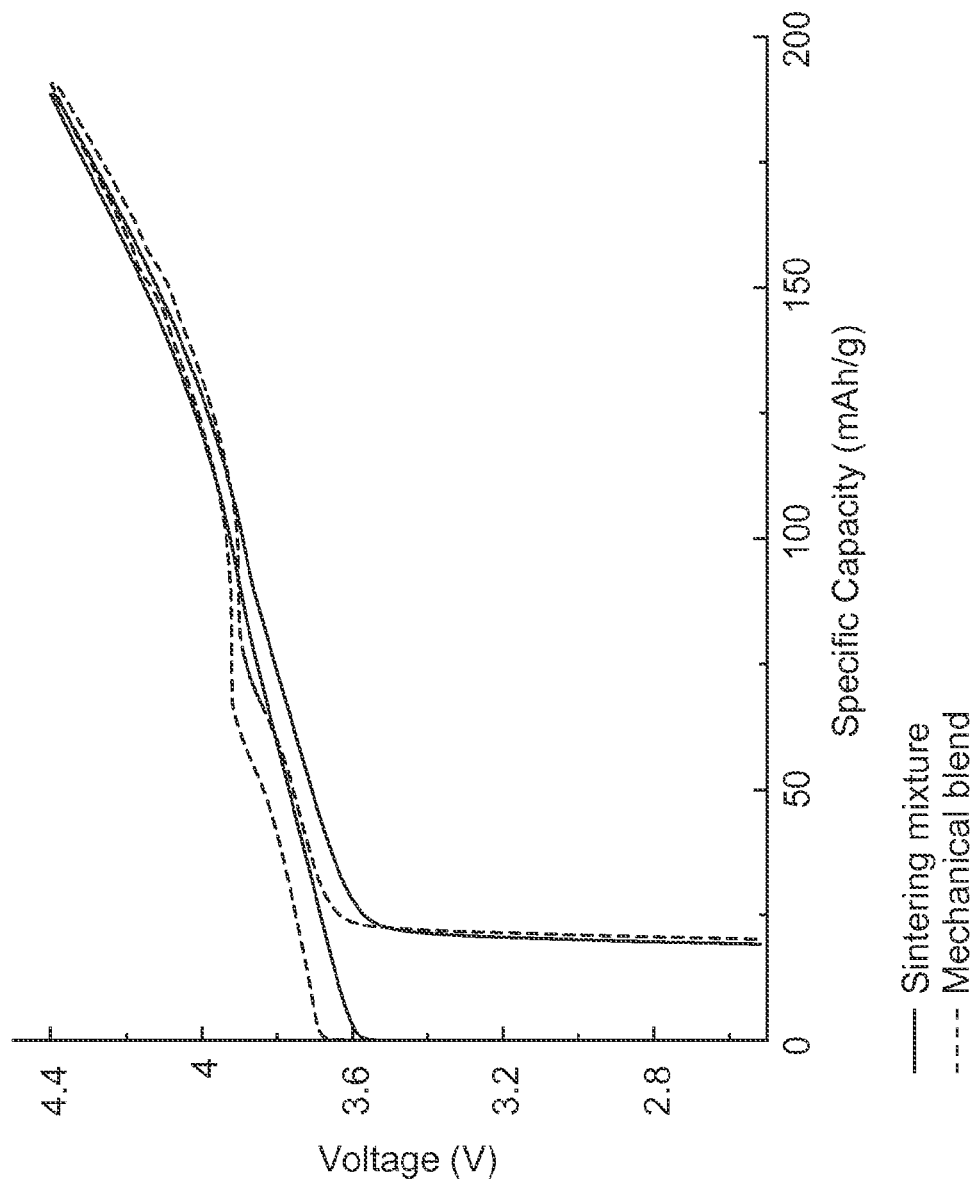
FIG. 1 is a graph of voltage (V) vs. specific capacity (mAh/g) for two electrochemical cells—one that has a cathode that includes the sintering mixture of Example 1 and the other that includes known material.

All numbers are herein assumed to be modified by the term "about". The recitation of numerical ranges by endpoints includes all numbers subsumed within that range (e.g., 1 to 5 includes 1, 1.5, 2, 2.75, 3, 3.80, 4, and 5).

In a first embodiment, provided are cathode compositions having particles that include a first distinct phase having a transition metal oxide comprising $Co_aNi_bMn_c$, where a is between 0.60 and 0.96, b is between 0.02 and 0.20, and c is between 0.02 and 0.20, wherein a, b, and c, are molar amounts of cobalt, nickel, and manganese, respectively, and wherein a+b+c=1; and a second distinct phase having a transition metal oxide comprising $Co_xNi_yMn_z$, where x is between 0.40 and 0.60, y is between 0.20 and 0.30, and z is between 0.20 and 0.30, wherein x, y, and z are molar amounts of cobalt, nickel, and manganese, respectively, and wherein x+y+z=1, and wherein each of the first distinct phase and the second distinct phase comprises a layered O3 crystal structure. These cathode compositions exhibit improved electrochemical cycling performance and capacity stability compared to known materials when incorporated into a lithium-ion electrochemical cell.

The particles can include a first distinct phase and a second distinct phase. By distinct phase it is meant that there are regions or domains within the particle that have a constant stoichiometry with a layered O3 crystal structure. Within the cathode compositions disclosed herein, there are particles that include at least two different distinct phases. Each distinct phase has a layered O3 crystal structure but a different stoichiometry. Each particle of the cathode composition can include at least both a first distinct phase and a second distinct phase. Or it is possible that, in some cases, one particle can have substantially a single composition and exhibit substantially only a first distinct phase and another particle can have substantially a different single material and exhibit substantially only a second distinct phase. In many embodiments, the cathode compositions likely include all combinations of these particles. It is likely that the large majority of particles include at least both a first distinct phase and a second distinct phase. The particles can have an average diameter of less than 200 µm, less than 100 µm, less than 50 µm, less than 25 µm, less than 10 µm, less than 1 µm, or even smaller. Because of the small particle size the cathode compositions can be referred to as powdered materials.

The method of making the cathode compositions of the first embodiment, for example, can include blending a cobalt oxide with a mixed metal hydroxide comprising a material having the formula, $Mn_xCo_yNi_zM_a(OH)_2$, a mixed metal oxide comprising a material having the formula $Mn_xCo_yNi_zM_aO_q$, or a combination thereof, wherein x, y, and z>0 and a>0, x+y+z+a=1, q>0, and M is selected from any transition metal except Mn, Co, or Ni to form a blend. To this blend can be added added lithium carbonate, lithium hydroxide, or a combination to the blend to form a mixture. The mixture can then be sintered by heating it to a temperature above about 750° C. and below about 950° C. for a period of time from between 1 and 10 hours. The mixture can then be heated above 1000° C. for an additional period of time until a stable composition is formed. This method is disclosed, for example, in applicants' cofiled and copending application, U.S. Pat. Publ. No. 2009/0087744 (Jiang).

The cathode composition of the first embodiment can include compositions that have a first distinct phase having a transition metal oxide that includes $Co_aNi_bMn_c$, where a is between 0.60 and 0.96, between 0.70 and 0.95, between 0.75 and 0.90, or between 0.75 and 0.85; b is between 0.02 and 0.20, between 0.05 and 0.15, or between 0.07 and 0.12; and c is between 0.02 and 0.20, between 0.05 and 0.15, or between 0.07 and 0.12; or any combination thereof where a+b+c=1. The cathode composition of the first embodiment can include compositions that have a second distinct phase having a transition metal oxide that includes $Co_xNi_yMn_z$, where x is between 0.40 and 0.60 or between 0.45 and 0.55; y is between 0.20 and 0.30 or between 0.22 and 0.27; and z is between 0.20 and 0.30 or between 0.22 and 0.27; or any combination thereof, wherein x+y+z=1. Each of the first distinct phase and the second distinct phase of the first embodiment comprises a layered O3 crystal structure. The first embodiment can include compositions wherein the molar amounts of nickel and manganese in the composition of the first distinct phase are substantially equal and wherein the molar amounts of and nickel and manganese in the composition of the second distinct phase are substantially equal. The cathode composition can include one or more metals, M, other than Mn, Ni, or Co in at least one distinct phase. The one or more metals can be selected from Li, Al, Ti, and Mg. The one or more metals can make up less than 15 wt %, less than 10 wt %, less than 5 wt %, or even less than 3 wt % of the composition.

In a second embodiment provided are cathode compositions having particles that include a first distinct phase comprising a transition metal oxide comprising $Co_aNi_bMn_c$, wherein a is between 0.00 and 0.30, b is between 0.60 and 0.90, and c is between 0.00 and 0.20, and where a+b+c=1; and a second distinct phase comprising a transition metal oxide comprising $Co_xNi_yMn_z$, wherein x is between 0.00 and 0.30, y is between 0.40 and 0.60, and z is between 0.20 and 0.40, and where x+y+z=1, wherein each of the first distinct phase and the second distinct phase comprises a layered O3 crystal structure.

The particles of this second embodiment can include a first distinct phase and a second distinct phase as is disclosed for the first embodiment. The particle size can be in the same range as for the first embodiment.

The method of making the compositions of the second embodiment, for example, can include blending a nickel hydroxide, such as $Ni(OH)_2$ with a mixed metal hydroxide that includes $Mn_xCo_yNi_zM_d(OH)_2$, a mixed metal oxide that includes $Mn_xCo_yNi_zM_dO_q$, or a combination thereof, wherein x, y, and z>0, and d≧0, x+y+z+d=1, q>0, and M is selected from any transition metal except Mn, Co, or Ni to form a blend. To this blend can be added lithium carbonate, lithium hydroxide, or a combination to the blend to form a mixture. The mixture can then be sintered by heating it to a temperature above about 750° C. and below about 950° C. for a period of time from between 1 and 10 hours. The mixture can then be heated above 1000° C. for an additional period of time until a stable composition is formed.

The cathode composition of the second embodiment can include compositions that have a first distinct phase having a transition metal oxide that includes, $Co_aNi_bMn_c$, where a is between 0.00 and 0.30, between 0.00 and 0.40, or between 0.00 and 0.50; b is between 0.60 or 0.90 or between 0.70 and 0.80; and c is between 0.02 or 0.20; or any combination thereof wherein a+b+c=1.00. The cathode composition of the first embodiment can include compositions that have a second distinct phase having a transition metal oxide that includes $Co_xNi_yMn_z$, where x is between 0.00 and 0.30, between 0.00 or 0.20, or between 0.00 and 0.10; y is between 0.40 and 0.60 or between 0.45 and 0.55; and z is between 0.20 and 0.40 or between 0.25 and 0.35; or any combination thereof wherein x+y+z=1.00. The cathode composition of the second embodiment can include compositions where the molar amounts of cobalt and manganese in the composition of the first distinct phase are substantially equal and where the molar amounts of cobalt and manganese in the composition of the second distinct phase are substantially equal. The cathode composition can include one or more metals, M, other than Mn, Ni, or Co in at least one distinct phase. The one or more metals may be selected from Li, Al, Ti, and Mg. The one or more metals can make up less than 15 wt %, less than 10 wt %, less than 5 wt %, or even less than 3 wt % of the composition.

To make a cathode from the cathode composition, the cathode composition, any selected additives such as binders, conductive diluents, fillers, adhesion promoters, thickening agents for coating viscosity modification such as carboxymethylcellulose and other additives known by those skilled in the art can be mixed in a suitable coating solvent such as water or N-methylpyrrolidinone (NMP) to form a coating dispersion or coating mixture. The coating dispersion or coating mixture can be mixed thoroughly and then applied to a foil current collector by any appropriate dispersion coating technique such as knife coating, notched bar coating, dip coating, spray coating, electrospray coating, or gravure coating. The current collectors can be typically thin foils of conductive metals such as, for example, copper, aluminum, stainless steel, or nickel foil. The slurry can be coated onto the current collector foil and then allowed to dry in air followed usually by drying in a heated oven, typically at about 80° C. to about 300° C. for about an hour to remove all of the solvent.

Cathodes made from cathode compositions of this disclosure can include a binder. Exemplary polymer binders include polyolefins such as those prepared from ethylene, propylene, or butylene monomers; fluorinated polyolefins such as those prepared from vinylidene fluoride monomers; perfluorinated polyolefins such as those prepared from hexafluoropropylene monomer; perfluorinated poly(alkyl vinyl ethers); perfluorinated poly(alkoxy vinyl ethers); aromatic, aliphatic, or cycloaliphatic polyimides, or combinations thereof. Specific examples of polymer binders include polymers or copolymers of vinylidene fluoride, tetrafluoroethylene, and propylene; and copolymers of vinylidene fluoride and hexafluoropropylene. Other binders that can be used in the cathode compositions of this disclosure include lithium polyacryate as disclosed in co-owned application U.S. Pat. Publ. No. 2008/0187838 (Le et al.). Lithium polyacrylate can be made from poly(acrylic acid) that is neutralized with lithium hydroxide. U.S. Pat. Publ. No. 2008/0187838 (Le et al.) discloses that poly(acrylic acid) includes any polymer or copolymer of acrylic acid or methacrylic acid or their derivatives where at least about 50 mol %, at least about 60 mol %, at least about 70 mol %, at least about 80 mol %, or at least about 90 mol % of the copolymer is made using acrylic acid or methacrylic acid. Useful monomers that can be used to form these copolymers include, for example, alkyl esters of acrylic or methacrylic acid that have alkyl groups with 1-12 carbon atoms (branched or unbranched), acrylonitriles, acrylamides, N-alkyl acrylamides, N,N-dialkylacrylamides, hydroxyalkylacrylates, and the like.

The cathode composition can also include an electrically conductive diluent to facilitate electron transfer from the powdered cathode composition to a current collector. Electrically conductive diluents include, but are not limited to, carbon (e.g., carbon black for negative electrodes and carbon black, flake graphite and the like for positive electrodes), metal, metal nitrides, metal carbides, metal silicides, and metal borides. Representative electrically conductive carbon diluents include carbon blacks such as SUPER P and SUPER S carbon blacks (both from MMM Carbon, Belgium), SHAWANIGAN BLACK (Chevron Chemical Co., Houston, Tex.), acetylene black, furnace black, lamp black, graphite, carbon fibers and combinations thereof.

The cathode compositions can include an adhesion promoter that promotes adhesion of the cathode composition or electrically conductive diluent to the binder. The combination of an adhesion promoter and binder can help the cathode composition better accommodate volume changes that can occur in the powdered material during repeated lithiation/delithiation cycles. Binders can offer sufficiently good adhesion to metals and alloys so that addition of an adhesion promoter may not be needed. If used, an adhesion promoter can be made a part of a lithium polysulfonate fluoropolymer binder (e.g., in the form of an added functional group) can be a coating on the powdered material, can be added to the electrically conductive diluent, or can be a combination of such uses. Examples of adhesion promoters include silanes, titanates, and phosphonates as described in U.S. Pat. Appl. Publ. No. 2004/0058240 A1 (Christensen).

Cathodes made from cathode compositions of this disclosure can be combined with an anode and an electrolyte to form a lithium-ion electrochemical cell or a battery from two or more electrochemical cells. Examples of suitable anodes can be made from compositions that include lithium, carbonaceous materials, silicon alloy compositions and lithium alloy compositions. Exemplary carbonaceous materials can include synthetic graphites such as mesocarbon microbeads (MCMB) (available from E-One Moli/Energy Canada Ltd., Vancouver, BC), SLP30 (available from TimCal Ltd., Bodio Switzerland), natural graphites and hard carbons. Useful anode materials can also include alloy powders or thin films. Such alloys may include electrochemically active components such as silicon, tin, aluminum, gallium, indium, lead, bismuth, and zinc and may also comprise electrochemically inactive components such as iron, cobalt, transition metal silicides and transition metal aluminides. Useful alloy anode compositions can include alloys of tin or silicon such as Sn—Co—C alloys, $Si_{60}Al_{14}Fe_8TiSn_7Mm_{10}$ and $Si_{70}Fe_{10}Ti_{10}C_{10}$ where Mm is a Mischmetal (an alloy of rare earth elements). Metal alloy compositions used to make anodes can have a nanocrystalline or amorphous microstructure. Such alloys can be made, for example, by sputtering, ball milling, rapid quenching or other means. Useful anode materials also include metal oxides such as $Li_4Ti_5O_{12}$, $WO_2$, $SiO_x$ and tin oxides or metal sulphites, such as $TiS_2$ and $MoS_2$. Other useful anode materials include tin-based amorphous anode materials such as those disclosed in U.S. Pat. Appl. No. 2005/0208378-A1.

Exemplary silicon alloys that can be used to make suitable anodes include compositions that comprise from about 65 to about 85 mole percent silicon, from about 5 to about 12 mole percent iron, from about to about 12 mole percent titanium, and from about 5 to about 12 mole percent carbon. Additional examples of useful silicon alloys include compositions that include silicon, copper, and silver or silver alloy such as those discussed in U.S. Pat. Publ. No. 2006/0046144 A1 (Obrovac et al.); multiphase, silicon-containing electrodes such as those discussed in U.S. Pat. Publ. No. 2005/0031957 A1 (Christensen et al.); silicon alloys that contain tin, indium and a lanthanide, actinide element or yttrium such as those described in U.S. Pat. Publ. Nos. 2007/0020521-A1, 2007/0020522A1, and 2007/0020528-A1 (all to Obrovac et al.);

amorphous alloys having a high silicon content such as those discussed in U.S. Pat. Publ. No. 2007/0128517-A1 (Christensen et al.); and other powdered materials used for negative electrodes such as those discussed in U. S. Pat. Publ. No. 2007/0269718 (Krause et al.) and PCT Intl. Publ. No. WO2007/044315 (Krause et al.). Anodes can also be made from lithium alloy compositions such as those of the type described in U.S. Pat. Nos. 6,203,944 and 6,436,578 (both to Turner et al.) and in U.S. Pat. No. 6,255,017 (Turner).

Electrochemical cells can contain an electrolyte. Representative electrolytes can be in the form of a solid, liquid or gel. Exemplary solid electrolytes include polymeric media such as polyethylene oxide, polytetrafluoroethylene, polyvinylidene fluoride, fluorine-containing copolymers, polyacrylonitrile, combinations thereof and other solid media that will be familiar to those skilled in the art. Examples of liquid electrolytes include ethylene carbonate, propylene carbonate, dimethyl carbonate, diethyl carbonate, ethyl-methyl carbonate, butylene carbonate, vinylene carbonate, fluoroethylene carbonate, fluoropropylene carbonate, γ-butylrolactone, methyl difluoroacetate, ethyl difluoroacetate, dimethoxyethane, diglyme(bis(2-methoxyethyl)ether), tetrahydrofuran, dioxolane, combinations thereof and other media that will be familiar to those skilled in the art. The electrolyte can be provided with a lithium electrolyte salt. Exemplary lithium salts include $LiPF_6$, $LiBF_4$, $LiClO_4$, lithium bis(oxalato)borate, $LiN(CF_3SO_2)_2$, $LiN(C_2F_5SO_2)_2$, $LiAsF_6$, $LiC(CF_3SO_2)_3$, and combinations thereof. Exemplary electrolyte gels include those described in U.S. Pat. No. 6,387,570 (Nakamura et al.) and U.S. Pat. No. 6,780,544 (Noh). The charge carrying media solubilizing power can be improved through addition of a suitable cosolvent. Exemplary cosolvents include aromatic materials compatible with Li-ion cells containing the chosen electrolyte. Representative cosolvents include toluene, sulfolane, dimethoxyethane, combinations thereof and other cosolvents that will be familiar to those skilled in the art. The electrolyte can include other additives that will familiar to those skilled in the art. For example, the electrolyte can contain a redox chemical shuttle such as those described in U.S. Pat. No. 5,709,968 (Shimizu), U.S. Pat. No. 5,763,119 (Adachi), U.S. Pat. No. 5,536,599 (Alamgir et al.), U.S. Pat. No. 5,858,573 (Abraham et al.), U.S. Pat. No. 5,882,812 (Visco et al.), U.S. Pat. No. 6,004,698 (Richardson et al.), U.S. Pat. No. 6,045,952 (Kerr et al.) and U.S. Pat. No. 6,387,571 B1 (Lain et al.); and in U.S. Pat. Appl. Publ. Nos. 2005/0221168 A1, 2005/0221196 A1, 2006/0263696 A1, and 2006/0263697 A1 (all to Dahn et al.).

Electrochemical cells that include cathode compositions of this invention can be made by taking at least one each of a positive electrode and a negative electrode as described above and placing them in an electrolyte. Typically, a microporous separator, such as CELGARD 2400 microporous material, available from Hoechst Celanese, Corp., Charlotte, N.C., is used to prevent the contact of the negative electrode directly with the positive electrode. This can be especially important in coin cells such as, for example, 2325 coin cells as known in the art.

The disclosed electrochemical cells can be used in a variety of devices, including portable computers, tablet displays, personal digital assistants, mobile telephones, motorized devices (e.g., personal or household appliances and vehicles), instruments, illumination devices (e.g., flashlights) and heating devices. One or more electrochemical cells of this invention can be combined to provide battery pack. Further details regarding the construction and use of rechargeable lithium-ion cells and battery packs will be familiar to those skilled in the art.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references included in this disclosure are herein incorporated be reference.

EXAMPLES

Electrochemical Cell Preparation

Preparation of Thin Film Cathodes

Electrodes were prepared as follows: 10% polyvinylidene difluoride (PVDF, Aldrich Chemical Co.) in N-methyl pyrrolidinone (NMP, Aldrich Chemical Co.) solution was prepared by dissolving about 10 g PVDF into 90 g of NMP solution. About 7.33 g SUPER P carbon (MMM Carbon, Belgium), 73.33 g of 10% PVDF in NMP solution, and 200 g NMP solution were mixed in a glass jar. The mixed solution contained about 2.6% of PVDF and SUPER P carbon each in NMP. 5.25 g of the solution was mixed with 2.5 g cathode composition using a MAZERUSTAR mixer machine (available from Kurabo Industries Ltd., Japan) for 3 minutes to form a uniform slurry. The slurry was then spread onto a thin aluminum foil on a glass plate using a 0.25 mm (0.010 inches) notch-bar spreader. The coated electrode was then dried in an 80° C. oven for around 30 minutes. The electrode was then put into a 120° C. vacuum oven for 1 hour to evaporate NMP and moisture. The dry electrode contained about 90% cathode material and 5% PVDF and SUPER P each. The mass loading of the active cathode material was around 8 $mg/cm^2$.

Preparation of Coin Cells

Coin cells were fabricated with the resulting cathode from Examples 1-4 and a Li metal anode in a 2325-size (23 mm diameter and 2.5 mm thickness) coin-cell hardware in a dry room. CELGARD 2400 microporous polypropylene film (available from Hoechst-Celanese) was used as a separator. It was wetted with a 1M solution of $LiPF_6$ (available from Stella Chemifa Corporation, Japan) dissolved in a 1:2 volume mixture of ethylene carbonate (EC) (Aldrich Chemical Co.) and diethyl carbonate (DEC) (Aldrich Chemical Co.). The coin cells were sealed by crimping.

Cycling of Coin Cells

The coin cells were initially charged and discharged between 4.4 V and 2.5 V at a current of 15 mA/g in the first cycle. In the second and third cycles, the cells were cycled at a current of 30 mA/g. From the fourth to ninth cycles, the cells were charged at the same current of 15 mA/g and discharged at different currents from 750 mA/g, 300 mA/g, 150 mA/g, 75 mAh/g, 30 mA/g, 15 mA/g, respectively, to test the rate capability of the cathode compositions within. The tenth and later cycles were for the cycling performance test and both charge and discharge currents are 75 mA/g.

Accelerating Rate Calorimeter (ARC) Exotherm Onset Temperature for Different Cathode Materials Preparation of Pellet Cathodes for ARC The method to prepare charged cathode compositions for thermal stability tests by ARC is described in J. Jiang, et al., *Electrochemistry Communications*, 6, 39-43, (2004). Usually, the mass of a pellet electrode used for the ARC is a few hundred milligrams. A few grams of active electrode material were mixed with 7% by mass, each of Super-P carbon black, PVDF, and excess NMP to make a slurry, following the same procedures described for preparing thin film cathode materials. After drying the electrode slurry at 120° C. overnight, the electrode powder was slightly ground in a mortar and then passed through a 300 μm sieve. A small amount (around 300 mg to 700 mg) of electrode powder was then placed in a stainless steel die to which 13.8 MPa (2000 psi) was applied to produce an approximately 1 mm thick pellet electrode. A 2325-size coin cell was constructed using the positive electrode pellet and the mesocarbon microbeads (MCMB) (available from E-One Moli/Energy Canada Ltd., Vancouver, BC) pellet sized to balance the capacity of both electrodes. The cells were firstly charged to a desired voltage, such as 4.4 V vs. Li, at a current of 1.0 mA. After reaching 4.4 V, the cells were allowed to relax to 4.1 V vs. Li. Then the cells were recharged to 4.4 V with half of the original current, 0.5 mA. After 4 cycles, the charged cells were transferred to the glove box and dissembled. The delithiated cathode pellets were taken out and rinsed with dimethyl carbonate (DMC) four times to remove the original electrolyte from the surface of charged cathode material. Then the sample was dried in the glove box vacuum antechamber for two hours to remove the residual DMC. Finally the sample was lightly ground again to be used in the ARC tests.

ARC Exotherm Onset Temperature Measurement

The stability test by ARC was described in J. Jiang, et al., *Electrochemistry Communications*, 6, 39-43, (2004). The sample holder was made from 304 stainless steel seamless tubing with a wall thickness of 0.015 mm (0.006 inches) (Microgroup, Medway, Mass.). The outer diameter of the tubing was 6.35 mm (0.250 inches) and the length of pieces cut for the ARC sample holders was 39.1 mm (1.540 inches). The temperature of the ARC was set to 110° C. to start the test. The sample was equilibrated for 15 min., and the self-heating rate was measured over a period of 10 min. If the self-heating rate was less than 0.04° C./min., the sample temperature was increased by 10° C., at a heating rate of 5° C./min. The sample was equilibrated at this new temperature for 15 min., and the self-heating rate was again measured. The ARC Exotherm Onset Temperature was recorded when the self-heating rate was sustained above 0.04° C./min. The test was stopped when the sample temperature reached 350° C. or the self-heating rate exceeded 20° C./min.

X-Ray Diffraction (XRD) Characterization

X-ray diffraction was to identify the crystalline structure of sintering cathode composition. A Siemens D500 diffractometer equipped with a copper target X-ray tube and a diffracted beam monochromator was used for the diffraction measurements. The emitted X-rays utilized were the Cu $K_{\alpha 1}$ ($\lambda$=1.54051 Å) and Cu $K_{\alpha 2}$ ($\lambda$=1.54433 Å). The divergence and anti-scatter slits used were set both at 0.5°, while the receiving slit was set at 0.2 mm. The X-ray tube was powered to 40 kV at 30 mA.

Energy Dispersive Spectroscopy (EDS)

Energy Dispersive X-Ray Spectroscopy (EDS) is a chemical microanalysis technique used in conjunction with Scanning Electron Microscopy (SEM) to detect x-rays emitted from the sample during bombardment by an electron beam to characterize the elemental composition of the analyzed volume. It is explained in more detail in, for example, the *Handbook of Analytical Methods for Materials*, published by the Materials Evaluation and Engineering, Inc., Plymouth, Minn. (2006), Website: www.mee-inc.com.

EDS was used to identify the chemical compositions of phases within the particles of the compositions of the cathodes of this disclosure. The SEM used was a Model JSM-6400 from JEOL, Ltd., Tokyo, Japan. The EDS system used was a Noran System Six from Thermo Electron Corp., Waltham, Mass.

Materials—Cathode Compositions

Cathode compositions were synthesized from binary mixtures of various amounts of $Co_3O_4$ and $Co_{1/3}Ni_{1/3}Mn_{1/3}(OH)_2$ or $Ni(OH)_2$ and $Co_{1/3}Ni_{1/3}Mn_{1/3}(OH)_2$ with $Li_2CO_3$. The resulting cathode materials after synthesis comprise two phases if different composition both of which have a layered O3 (R-3m) structure.

Example 1

6.953 g of $Co_3O_4$ (available from OMG Inc., Cleveland, Ohio) and 8.047 g of $Li[Co_{1/3}Ni_{1/3}Mn_{1/3}]O_2$ (available from Pacific Lithium Inc., New Zealand) were mixed with 6.824 g of $Li_2CO_3$ (available from FMC, US). The powdered mixture was heated to 750° C. at a rate of 4° C./min and then allowed to remain at that temperature for 4 hours. The powdered mixture then was heated to 1000° C., at 4° C./min and then allowed to remain at that temperature for 4 hours. Then the powder was cooled down to room temperature at 4° C./min. After grinding, the powder then was passed through a 110 μm sieve. EDS analysis of Example 1 was performed and Example 1 was found to have two distinct phases. The first phase was determined by EDS to have a transition metal composition of $Co_{0.72}Ni_{0.15}Mn_{0.13}$ and the second phase had a transition metal composition of $Co_{0.55}Ni_{0.23}Mn_{0.22}$.

Example 2

11.637 g of $Co_3O_4$ and 3.363 g of $Li[Co_{1/3}Ni_{1/3}Mn_{1/3}]O_2$ were mixed with 6.956 g of $Li_2CO_3$. The powdered mixture was heated to 750° C. at a rate of 4° C./min and then allowed to remain at that temperature for 4 hours. The powdered mixture then was heated to 1000° C. at 4° C./min and then allowed to remain at that temperature for 4 hours. Then the powder was cooled down to room temperature at 4° C./min. After grinding, the powder then was passed through a 110 μm sieve. The first phase was determined by EDS to have a transition metal composition of $Co_{0.90}Ni_{0.05}Mn_{0.05}$ and the second phase had a transition metal composition of $Co_{0.58}Ni_{0.20}Mn_{0.22}$. FIG. 6 is an EDS map of the sintered mixture of Example 2.

Example 3

2.664 g of $Co_3O_4$ and 12.336 g of $Li[Co_{1/3}Ni_{1/3}Mn_{1/3}]O_2$ were mixed with 6.704 g of $Li_2CO_3$. The powdered mixture was heated to 750° C. at a rate of 4° C./min and then allowed to remain at that temperature for 4 hours. The powdered mixture then was heated to 1000° C. at 4° C./min and then allowed to remain at that temperature for 4 hours. Then the powder was cooled down to room temperature at 4° C./min. After grinding, the powder then was passed through a 110 μm sieve. The first phase was determined by EDS to have a transition metal composition of $Co_{0.94}Ni_{0.03}Mn_{0.03}$ and the second phase had a transition metal composition of $Co_{0.52}Ni_{0.23}Mn_{0.25}$.

Example 4

7.116 g of $Ni(OH)_2$ and 7.111 g of $Li[Co_{1/3}Ni_{1/3}Mn_{1/3}]O_2$ were mixed with 5.975 g of $Li_2CO_3$. The powdered mixture was heated to 750° C. at a rate of 4° C./min and then allowed to remain at that temperature for 4 hours. The powdered mixture then was heated to 1000° C. at 4° C./min and then allowed to remain at that temperature for 4 hours. Then the powder was cooled down to room temperature at 4° C./min. After grinding, the powder then was passed through a 110 μm sieve. The first phase was determined by EDS to have a transition metal composition of $Co_{0.15}Ni_{0.76}Mn_{0.09}$ and the second phase had a transition metal composition of $Co_{0.18}Ni_{0.57}Mn_{0.25}$.

Performance

FIG. 1 shows the voltage (V) vs. specific capacity (mAh/g) for an electrochemical cell (coin cell) containing a cathode that is made from the sintering mixture of Example 1 and for another coin cell containing a cathode that is made from a mechanical blend of a 1:1 mass ratio of $LiCoO_2$ and $Li[Co_{1/3}Mn_{1/3}Ni_{1/3}]O_2$ with no additional treatment. The electrochemical cells were cycled through one complete cycle by first charging to 4.4 V vs. Li at a current of C/10 (17 mA/g) and then by discharging to 2.5 V vs. Li at the same current. It is clearly shown that the curve for the sintering mixture is smooth and different from that of the mechanical blend.

Figure 2:
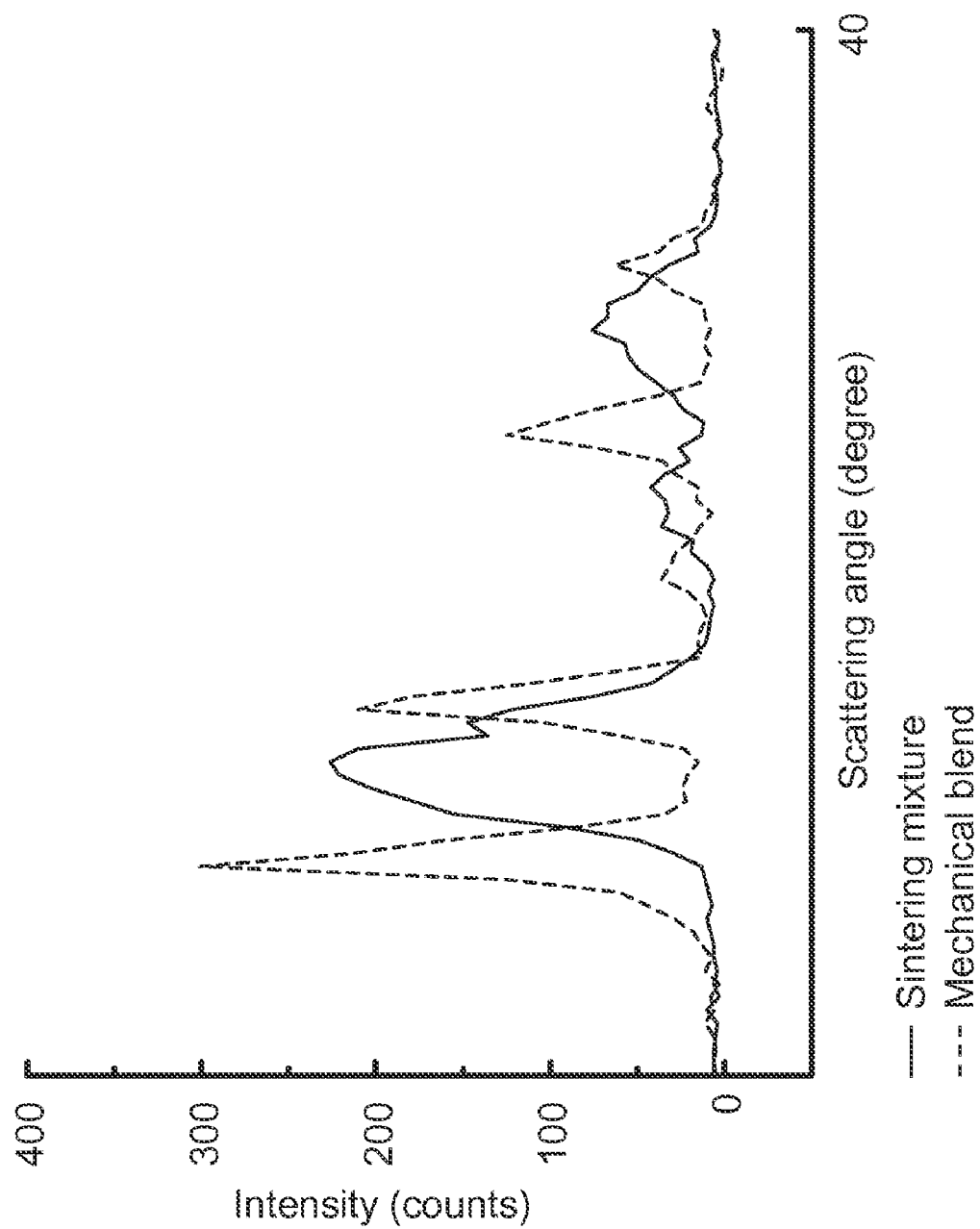
FIG. 2 is a graph of the X-ray diffraction pattern of the cathodes in FIG. 1.

FIG. 2 shows a portion of the X-ray diffraction (XRD) spectrum of the sintering mixture of Example 1 and the 1:1 mechanical blend from the previous paragraph between a scattering angle of 35 and 40 degrees. The crystalline structure of the sintering mixture is very different from that of the mechanical blend and also does not appear to be a combination of the ingredients of the mechanical blend. This XRD scan shows that the sintering material is not the same composition as the mechanical blend.

Figure 3:
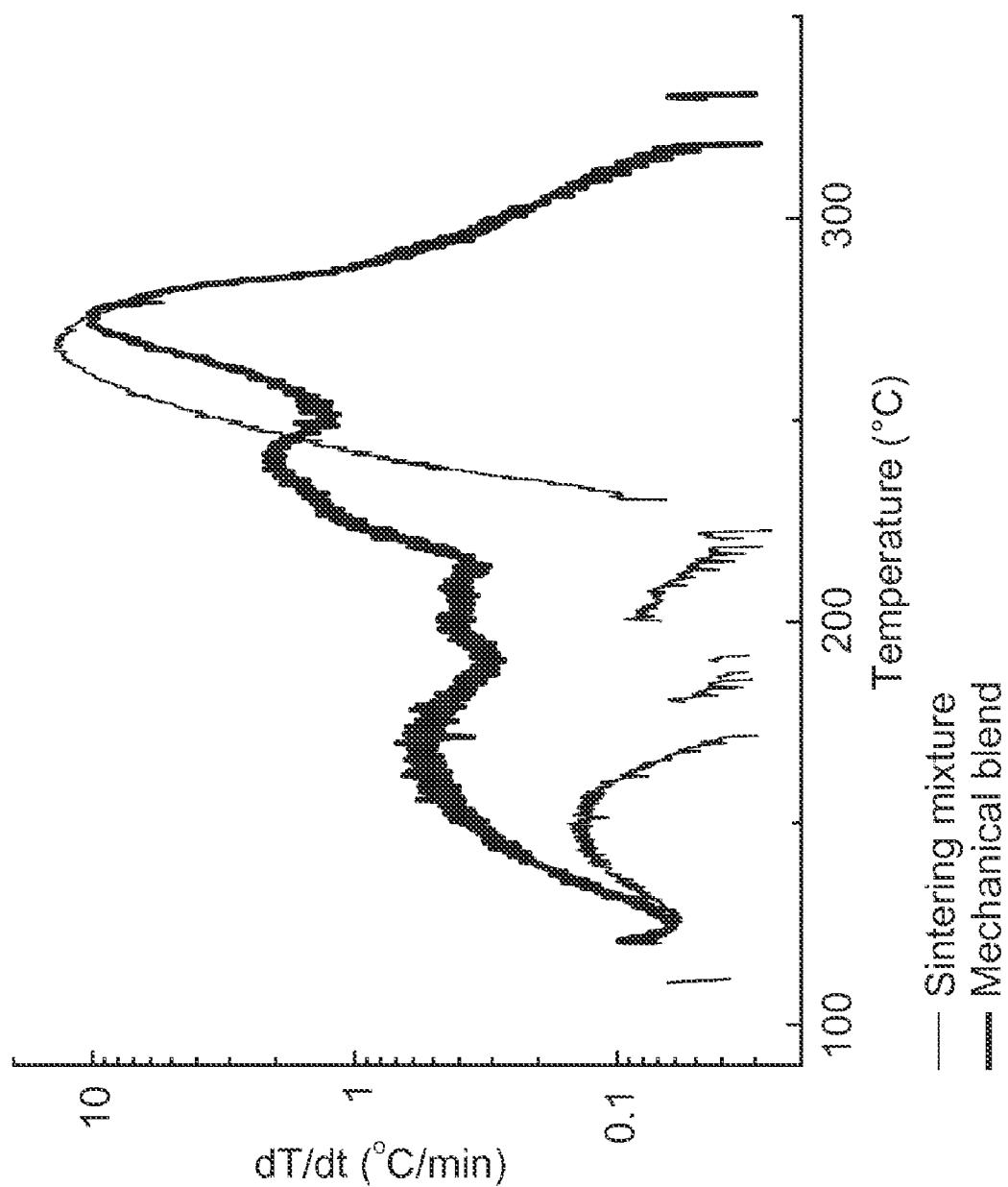
FIG. 3 is a graph of the self-heating rate vs. temperature of the cathodes with the known material in FIG. 1 (after being charged to 4.4 V vs. Li) and the cathode composition with the known material in FIG. 1. reacting with 1M $LiPF_6$ EC/DEC (1:2 by volume).

FIG. 3 shows the ARC self-heating rate versus temperature of 100 mg of sintering mixture from Example 1 (after charged to 4.4 V vs. Li) reacting with 30 mg 1 M $LiPF_6$ EC/DEC compared to 100 mg of the 1:1 mechanical blend described above. The mechanical blend was shown to have an onset temperature of self-heating of about 120° C. The sintering mixture had a much higher onset temperature of self-heating (around 260° C.). This suggests that the sintering mixture of Example 1 had significantly greater thermal stability than a mechanical blend with the same molar ratio (1:1) of metals.

Figure 4:
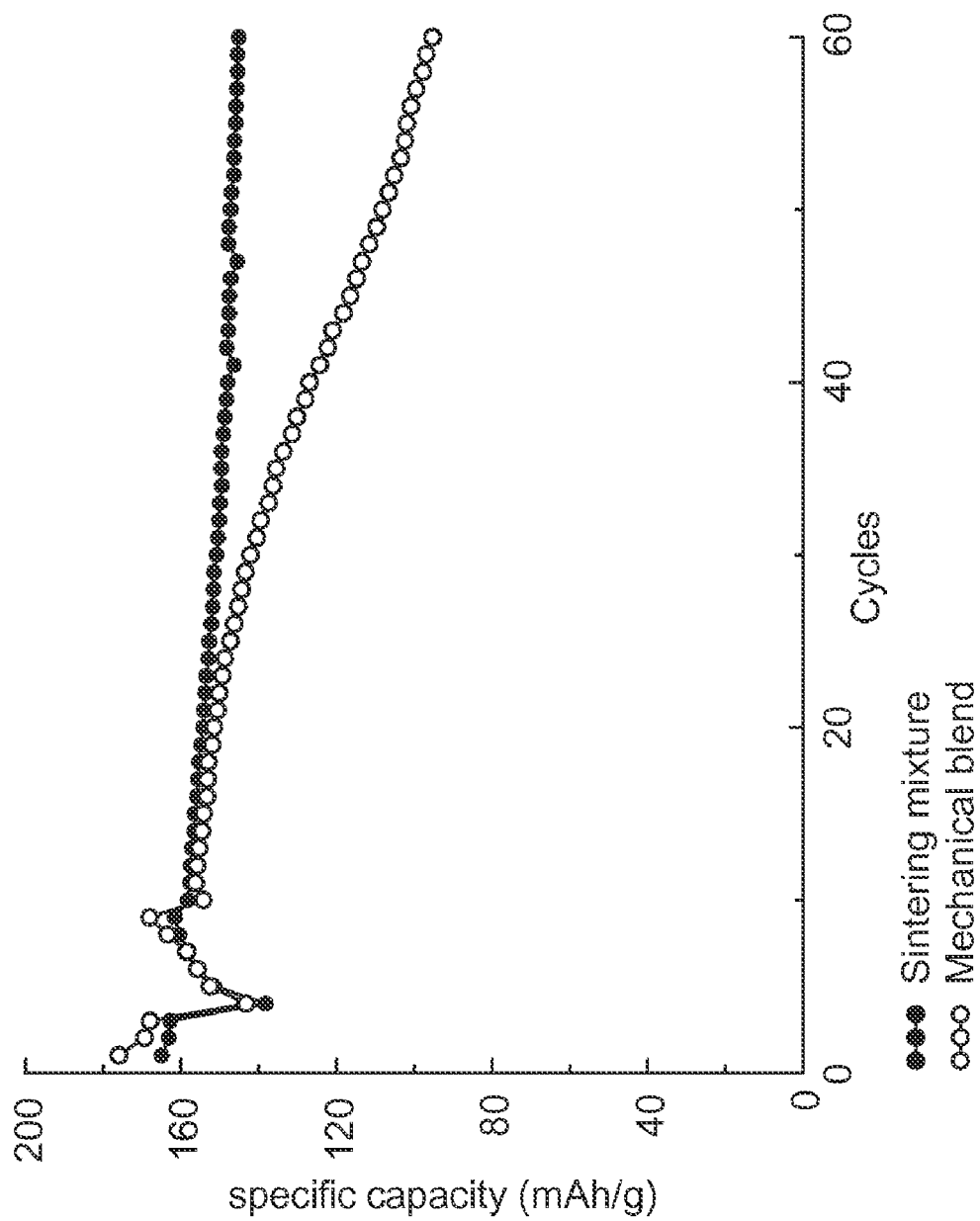
FIG. 4 is a comparison of the specific capacity (mAh/g) vs. number of charge/discharge cycles for the two electrochemical cells used in FIG. 1.

FIG. 4 is a plot of the cycling performance comparison of the sintering mixture from Example 1 and a mechanical blend with the same mass ratio (1:1) of metals from 2.5 to 4.4 V. The sintering mixture clearly showed higher capacity and better capacity retention after 60 cycles at a current of 75 mAh/g than the mechanical blend.

Figure 5:
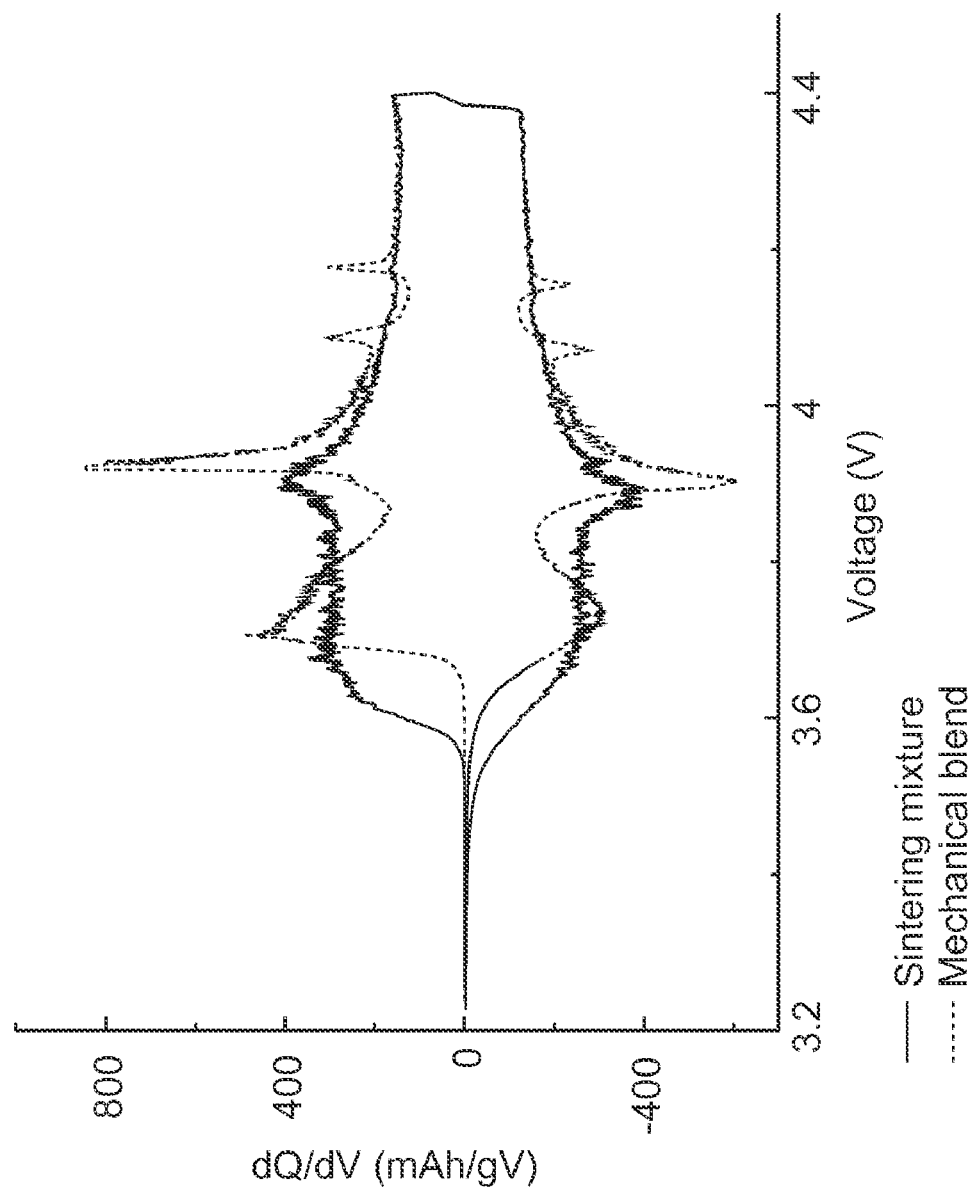
FIG. 5 is a dQ/dV curve vs. voltage for the two electrochemical cells used in FIG. 1.

FIG. 5 is a plot of the differential (dQ/dV) in mAh/(gV) vs. voltage for the sintering mixture of Example 1 and a mechanical blend with the same mass ratio (1:1) of metals upon cycling to 4.4 V vs. Li. FIG. 5 shows that the electrochemical behavior of the sintering mixture is very different from that of the mechanical blend indicating the the two materials have very different properties.

Figure 6A:
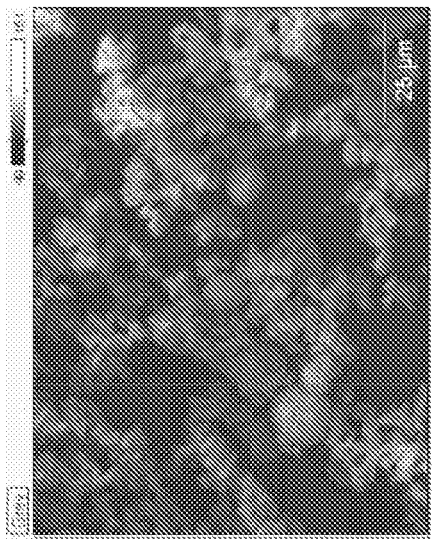
FIG. 6A is a photomicrograph of particles of the sintering mixture of Example 2.
Figure 6B:
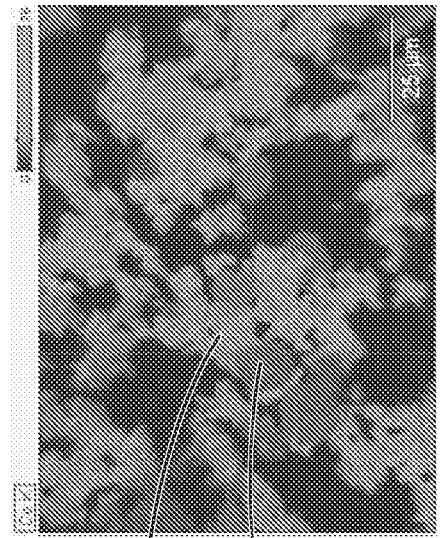
FIG. 6B is a SEM-EDS map of the cobalt concentrations of the same region of the sintering mixture shown in FIG. 6A.
Figure 6C:
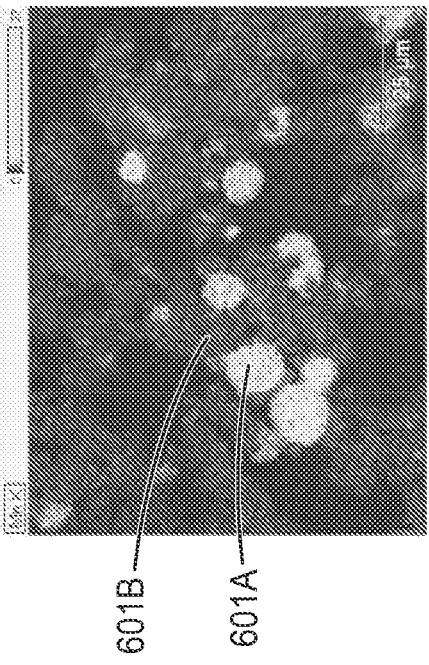
FIG. 6C is a SEM-EDS map of the manganese concentrations of the same region of the sintering mixture shown in FIG. 6A.
Figure 6D:
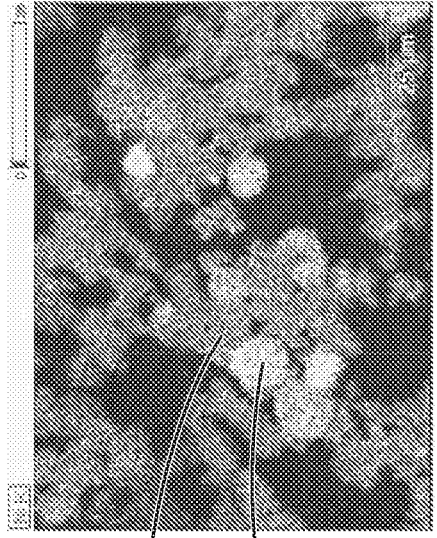
FIG. 6D is a SEM-EDS map of the nickel concentrations of the same region of the sintering mixture shown in FIG. 6A.

FIG. 6A is a black and white photomicrograph of a sample of the sintered cathode composition of Example 2. This figure shows areas that contain particles of irregular shape and some void areas (black) between the particles. FIGS. 6B, 6C, and 6D are EDS maps of the same area of view as FIG. 6A. FIG. 6B maps the intensity of the EDS x-ray that corresponds to cobalt. The intensity of the map is directly proportional to the amount of cobalt present at each location of the map. It can be seen that there are two different intensities of cobalt at, for example, the regions indicated by 601A and 601B. FIG. 6C maps the manganese locations by EDS and FIG. 6D maps the nickel locations. The combination of FIGS. 6B, 6C, and 6D show, by intensities, the concentrations of cobalt, manganese, and nickel at points 601A and 601B. The location 601A (first phase) has a transition metal composition of $Co_{0.90}Mn_{0.05}Ni_{0.05}$ and the second phase 601B has a transition metal composition of $Co_{0.58}Mn_{0.22}Ni_{0.20}$. It can be seen that there appear to be at least two levels of cobalt, manganese, and nickel by looking at the intensities of FIGS. 6B, 6C, and 6D. FIGS. 6A-6D and the analysis of the EDS data show that for Example 2 there are two distinct phases with two different and analyzable compositions of transition metals.

A number of embodiments have been described. Nevertheless, it will be understood that various modifications may be made without departing from the spirit and scope of the invention. Accordingly, other embodiments are within the scope of the following claims.

What is claimed is:

1. A cathode composition having particles comprising:
   a first distinct phase having a transition metal oxide comprising $Co_aNi_bMn_c$, where a is between 0.60 and 0.96, b is between 0.02 and 0.20, and c is between 0.02 and 0.20, wherein a, b, and c, are molar amounts of cobalt, nickel, and manganese, respectively, and wherein a+b+c=1; and
   a second distinct phase having a transition metal oxide comprising $Co_xNi_yMn_z$, where x is between 0.40 and 0.60, y is between 0.20 and 0.30, and z is between 0.20 and 0.30, wherein x, y, and z are molar amounts of cobalt, nickel, and manganese, respectively, and wherein x+y+z=1,
   wherein each particle includes at least both the first distinct phase and the second distinct phase, and
   wherein each of the first distinct phase and the second distinct phase comprises a layered O3 crystal structure.

2. The cathode composition of claim 1 wherein the molar amounts of nickel and manganese are substantially equal in the first distinct phase and the molar amounts of nickel and manganese are substantially equal in the second distinct phase.

3. The cathode composition of claim 1 wherein the particles have an average diameter of less than 50 μm.

4. The cathode composition of claim 1 wherein the particles have an average diameter of less than 10 μm.

5. The cathode composition of claim 1 further comprising one or more metals other than Mn, Ni, Co in at least one distinct phase.

6. The cathode composition of claim 5 wherein the one or more metals are selected from Li, Al, Ti, and Mg in at least one distinct phase.

7. The cathode composition of claim 5 wherein the one or more metals make up less than 10 weight percent of the composition.

8. A cathode composition having particles comprising:
   a first distinct phase comprising a transition metal oxide comprising $Co_aNi_bMn_c$, wherein a is between 0.00 and 0.30, b is between 0.60 and 0.90, and c is between 0.00 and 0.20, and where a+b+c=1; and
   a second distinct phase comprising a transition metal oxide comprising $Co_xNi_yMn_z$, wherein x is between 0.00 and 0.30, y is between 0.40 and 0.60, and z is between 0.20 and 0.40, and where x+y+z=1,
   wherein each particle includes at least both the first distinct phase and the second distinct phase, and
   wherein each of the first distinct phase and the second distinct phase comprises a layered O3 crystal structure.

9. The composition of claim 8 wherein wherein the molar amounts of cobalt and manganese are substantially equal in the first distinct phase and the molar amounts of cobalt and manganese are substantially equal in the second distinct phase.

10. The composition of claim 8 wherein the particles have an average diameter of less than 50 μm.

11. The composition of claim 8 wherein the particles have an average diameter of less than 10 μm.

12. The composition of claim 8 further comprising one or more metals other than Mn, Ni, Co in at least one distinct phase.

13. The composition of claim 12 wherein one or more metals are selected from Li, Al, Ti, and Mg in at least one distinct phase.

14. The composition of claim 12 wherein the one or more metals comprise less than 10 weight percent of the composition.

15. A lithium-ion battery comprising a cathode comprising a composition according to claim 1.

16. A lithium-ion battery comprising a cathode comprising a composition according to claim 8.

* * * * *

UNITED STATES PATENT AND TRADEMARK OFFICE
CERTIFICATE OF CORRECTION

| | | |
|---|---|---|
| PATENT NO. | : 8,012,624 B2 | Page 1 of 1 |
| APPLICATION NO. | : 12/233997 | |
| DATED | : September 6, 2011 | |
| INVENTOR(S) | : Junwei Jiang et al. | |

It is certified that error appears in the above-identified patent and that said Letters Patent is hereby corrected as shown below:

Column 3,
Line 59, delete "$a>0$," and insert --$a\geq 0$,-- therefor.

Column 3,
Line 61, after the word "added" delete the second occurrence of the word "added".

Column 8,
Line 10, delete "be" and insert --by-- therefor.

Column 10,
Line 20, delete "C.," and insert --C.-- therefor.

Column 11,
Line 51, after the word "the" delete the second occurrence of the word "the".

Column 12,
Line 61, Claim 9, after the word "wherein" delete the second occurrence of the word "wherein".

Signed and Sealed this
Nineteenth Day of June, 2012

David J. Kappos
*Director of the United States Patent and Trademark Office*